US008641403B2

(12) United States Patent
Martini et al.

(10) Patent No.: US 8,641,403 B2
(45) Date of Patent: Feb. 4, 2014

(54) UNIT AND METHOD FOR MOLDING OPENING DEVICES FOR APPLICATION TO PACKAGES OF POURABLE FOOD PRODUCTS

(75) Inventors: Pietro Martini, Parma (IT); Graeme Naismith, St. Andrews (AU)

(73) Assignee: Tetra Laval Holdings & Finance S.A., Pully (CH)

( * ) Notice: Subject to any disclaimer, the term of this patent is extended or adjusted under 35 U.S.C. 154(b) by 833 days.

(21) Appl. No.: 12/223,304

(22) PCT Filed: Dec. 29, 2006

(86) PCT No.: PCT/EP2006/070282
§ 371 (c)(1),
(2), (4) Date: Jul. 28, 2008

(87) PCT Pub. No.: WO2007/085340
PCT Pub. Date: Aug. 2, 2007

(65) Prior Publication Data
US 2008/0315452 A1    Dec. 25, 2008

(30) Foreign Application Priority Data
Jan. 27, 2006   (EP) .................................. 06100974

(51) Int. Cl.
*B28B 1/48*    (2006.01)
(52) U.S. Cl.
USPC ........................................................ 425/290
(58) Field of Classification Search
USPC ........................... 264/320, 154, 318; 425/290
See application file for complete search history.

(56) References Cited

U.S. PATENT DOCUMENTS 5,037,290 A    8/1991   Curliss et al.
5,820,807 A  * 10/1998   Urmston ....................... 264/318

FOREIGN PATENT DOCUMENTS

| EP | 0 949 992 B1 | 10/1999 |
| JP | 62-211117 A | 9/1987 |
| JP | 64-67317 A | 3/1989 |
| JP | 5-213341 A | 8/1993 |
| JP | 6-218762 A | 8/1994 |
| JP | 10-175221 A | 6/1998 |

(Continued)

OTHER PUBLICATIONS

English language translation of Japanese Office Action issued Sep. 13, 2011 by the Japanese Patent Office in corresponding Japanese Application No. 2008-551684.

(Continued)

*Primary Examiner* — Larry Thrower
(74) *Attorney, Agent, or Firm* — Buchanan Ingersoll & Rooney PC

(57) ABSTRACT

A molding unit for producing an opening device, wherein a web having plural holes is fed to the unit, and the opening device has a spout closed by a membrane, a neck portion projecting from the spout, and a pull ring extending from the membrane inside the neck portion. The unit includes first and second mold devices cooperating with the web to define a closed cavity, and movable to be detached from the web. The unit also has a first and a second matrix which can be set to a configuration in which they are located inside the cavity to define a first and second volume. The matrices are movable relative to the web to disengage the opening device from the volumes and permit removal of the opening device by feeding forward the web. A single actuator moves one of the mold device and the matrices to/from the web.

20 Claims, 3 Drawing Sheets

(56) References Cited

FOREIGN PATENT DOCUMENTS

| | | |
|---|---|---|
| JP | 2001-502981 A | 3/2001 |
| JP | 2001-503344 A | 3/2001 |
| JP | 2001-354257 A | 12/2001 |
| JP | 2005-511363 A | 4/2005 |
| WO | WO 98/18608 A1 | 5/1998 |
| WO | WO 98/18609 A1 | 5/1998 |
| WO | WO 03/051603 A1 | 6/2003 |

OTHER PUBLICATIONS

International Search Report, 2007.
Written Opinion of the International Search Authority, 2007.

* cited by examiner

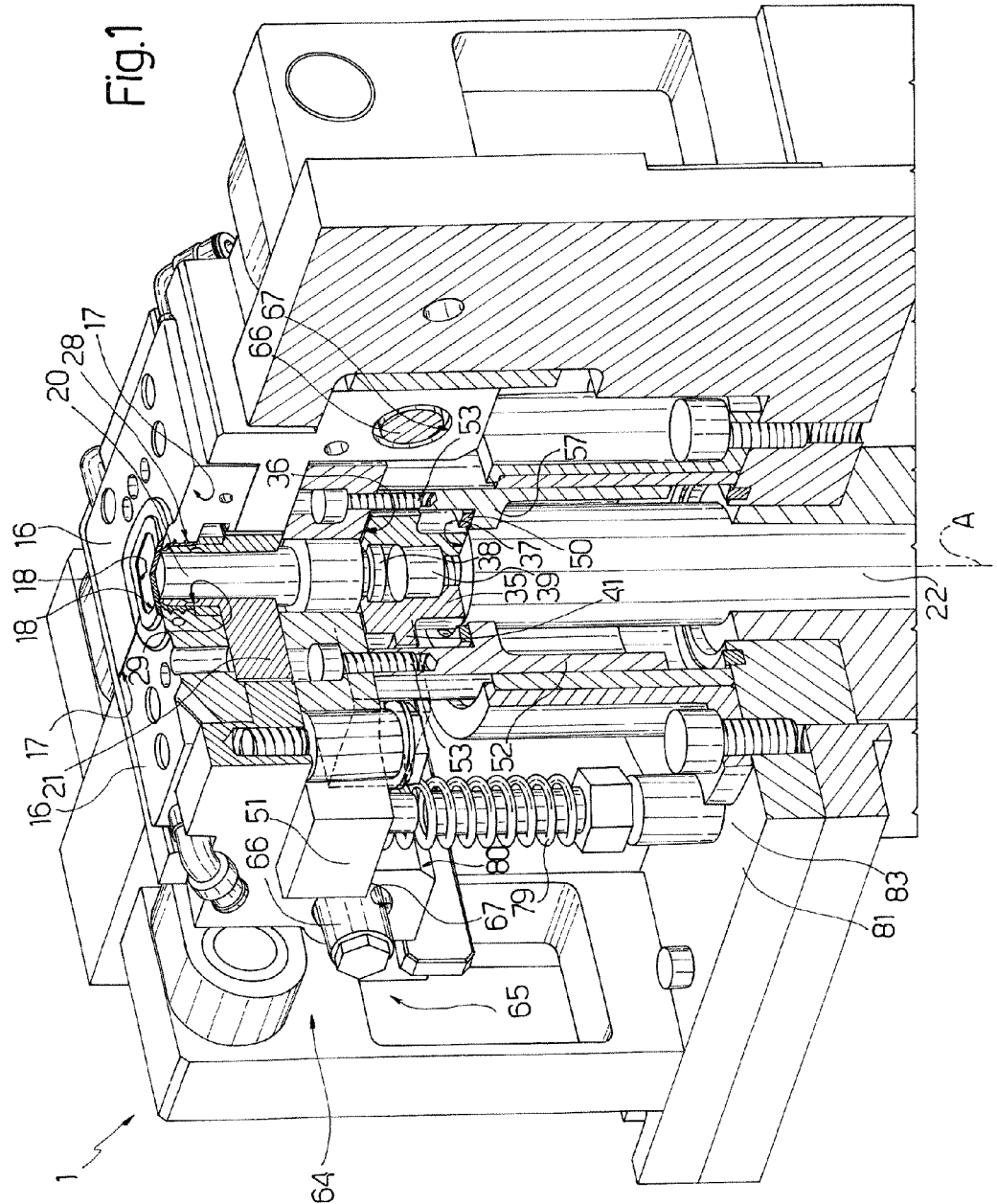

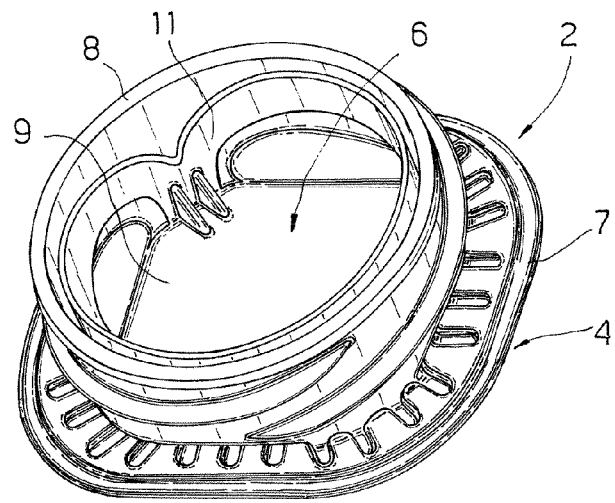
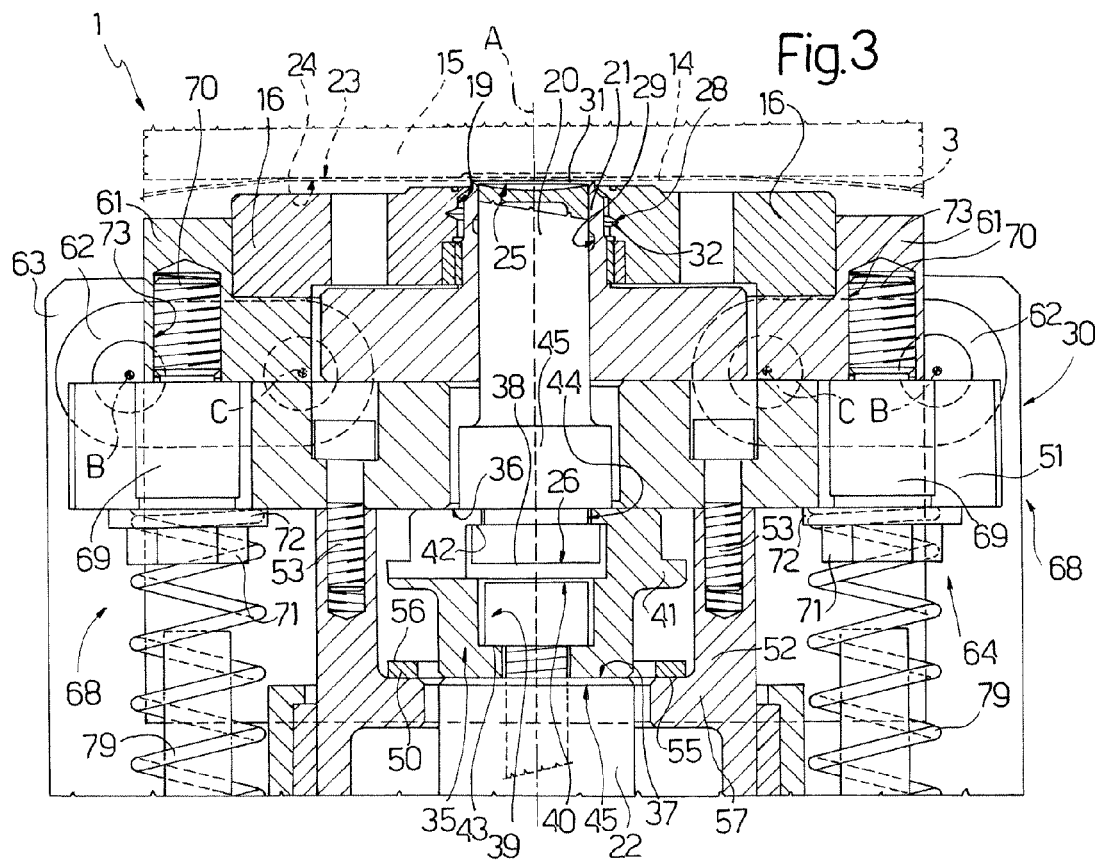

UNIT AND METHOD FOR MOLDING OPENING DEVICES FOR APPLICATION TO PACKAGES OF POURABLE FOOD PRODUCTS

TECHNICAL FIELD

The present invention relates to a unit and method for molding opening devices for application to packages of pourable food products.

BACKGROUND ART

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent such as a hydrogen peroxide solution, which is subsequently removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open packages of the type described above, various solutions have been proposed, including reclosable opening devices, which substantially comprise a spout, e.g. tubular, defining a through opening and fitted to a surface of the package, about a hole or a removable or pierceable portion in the surface; and a removable, e.g. screw or hinged, cap fitted to a neck portion projecting from the spout on the opposite side to the surface of the package, to outwardly close the spout.

When the opening device is fitted about a hole in the package, the opening of the spout is closed by a membrane made of plastic material, connected integrally to the spout, and detachable from the spout along a preferential, normally circular, tear line. The membrane is normally fixed to the top (i.e. outer) edge of the spout, and is fitted integrally, on the side facing the cap, with a projecting so-called pull ring, which is pulled off by its free end to detach the membrane from the spout along the preferential tear line and so free the opening to pour out the product. More specifically, the pull ring extends inside and at a predetermined distance from the neck portion.

The opening devices are known to be produced, as described for example in Patent EP-B-099992, using a molding unit, which interacts with a web of packaging material to mold a number of opening devices at respective holes in the web or formed in the web upstream from the molding unit.

More specifically, the web is fed through the molding unit, which comprises a first mold on a first side of the web, and two second molds on an opposite second side of the web.

As the web is fed through, the first mold and second molds are movable into a first configuration detached from and therefore not interfering with the first and second side of the web respectively; and, when the first mold and second molds are aligned with each hole in the web, they are moved into a second configuration cooperating with the first and second side of the web respectively.

More specifically, in the second configuration, a projection on the first mold is housed inside the hole, and defines, with a recess on the two second molds, a closed molding cavity, into which the molding material is injected to mold the opening device.

More specifically, the closed cavity comprises a base portion extending parallel to the travelling direction of the web; and a lateral annular portion defined between facing walls of the recess of the projection extending perpendicularly to the travelling direction.

The membrane can therefore be molded inside the cavity, and the pull ring and/or the neck portion of the opening device, to which the cap is fitted, can be molded in the annular portion.

Molding units of the above type cannot be used for molding opening devices, in which the pull ring projects from the membrane inside and a predetermined distance from the neck portion.

DISCLOSURE OF INVENTION

It is an object of the present invention to provide a molding unit designed to eliminate the aforementioned drawback in a straightforward, low-cost manner and using only a small number of component parts.

According to the present invention, there is provided a molding unit for producing opening devices for application to packages of pourable food products; said unit being fed with a web of packaging material having a number of holes; said opening device comprising a spout closed by a membrane detachable from the spout, a neck portion projecting from said spout and to which a cap is fitted releasably, and a pull ring extending from said membrane inside said neck portion and by which to detach the membrane from said spout; said unit comprising first and second mold means cooperating, at one of said holes, with said web to define a closed cavity, and movable so as to be detached from said web; said unit being characterized by comprising a first and a second matrix which can be set to a configuration in which they are located inside the cavity to define a first volume extending between said first matrix and said first and second mold means and of the same shape as said neck portion and said membrane, and a second volume of the same shape as said pull ring and extending between said first and said second matrix; said first and said second matrix being movable with respect to said web to disengage said opening device from said first and said second volume and permit removal of the opening device by feeding forward said web; and said unit also being characterized by comprising a single actuator, which moves at least one of said first and second mold means to/from said web, and moves said first and second matrix inside said cavity to/from said web.

The present invention also relates to a method of producing a number of opening devices for application to packages of pourable food products; said opening devices comprising a spout closed by a membrane detachable from the spout, a neck portion projecting from said spout and to which a cap is fitted releasably, and a pull ring extending from said membrane inside said neck portion and by which to detach the membrane from said spout; said method comprising the steps of:

feeding a web of packaging material, having a number of holes, along a path; and
causing first and second mold means to interact with said web, at one of said holes, to define a closed cavity;
and being characterized by comprising the further steps of:
inserting a first and a second matrix inside said cavity to define a first volume extending between said first matrix and said first and second mold means and of the same shape as said neck portion and said membrane; and a second volume extending between said first and second matrix and of the same shape as said pull ring;
withdrawing said first and second matrix and at least one of said first and second mold means from said web by means of a single actuator, to disengage said opening device and permit removal of the molded opening device from said cavity by feeding the web forward; and
moving said first and second matrix and at least one of said first and second mold means towards said web by means of said actuator and following removal of the opening device.

BRIEF DESCRIPTION OF THE DRAWINGS

A preferred, non-limiting embodiment of the present invention will be described by way of example with reference to the accompanying drawings, in which:

FIG. 1 shows a partly sectioned view in perspective of the molding unit according to the present invention;

FIG. 2 shows a larger-scale top view in perspective of an opening device produced by the FIG. 1 molding unit;

FIGS. 3 to 5 show sections of the FIG. 1 molding unit in three different operating positions.

BEST MODE FOR CARRYING OUT THE INVENTION

Figure 4:
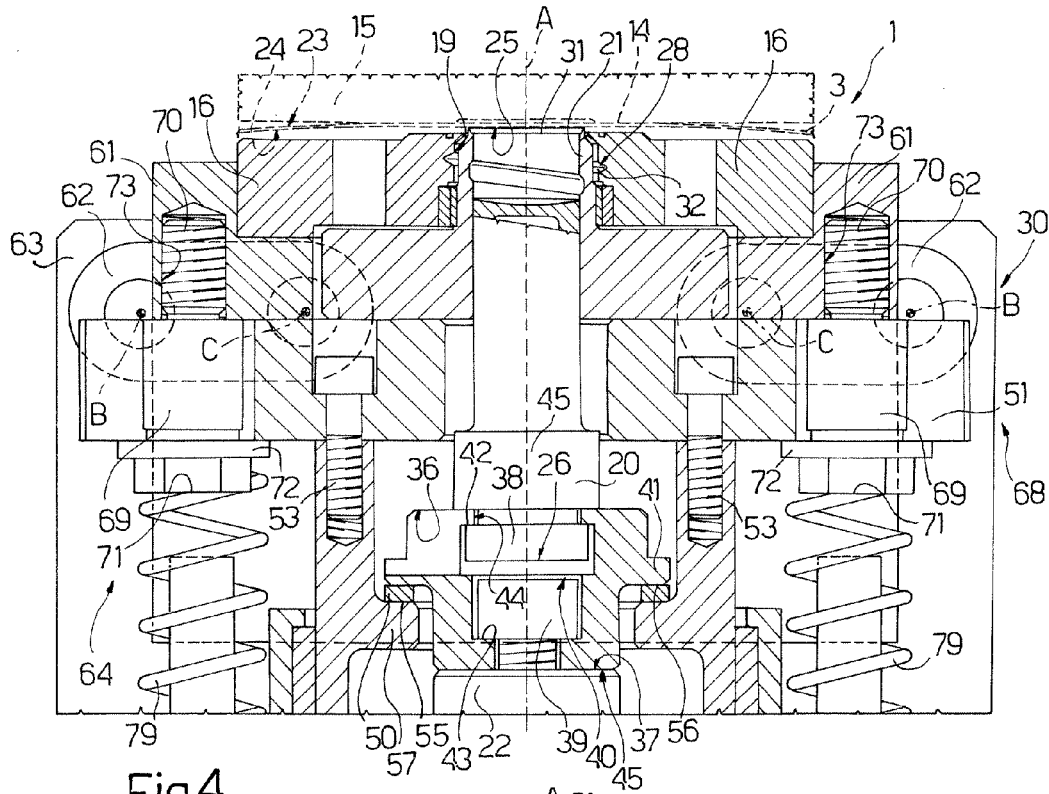

With reference to FIGS. 1 and 3 to 5, number 1 indicates as a whole a molding unit in accordance with the present invention, and which can be incorporated in a known pourable food product packaging machine (not shown) of the type described in the introduction, to mold opening devices 2 (one shown in FIG. 2) for application to sealed packages (not shown) of pourable food products.

Non-limiting examples of packages produced on packaging machines of the above type include parallelepiped-shaped packages known by the trade name Tetra Brik Aseptic (registered trademark) or so-called "gable-top" packages known by the trade name Tetra Rex (registered trademark).

The packaging material of which the packages are made has a multilayer structure (not shown) comprising a base layer of fibrous material, e.g. paper, or mineral-filled polypropylene material, covered on both sides with layers of thermoplastic material, e.g. polyethylene film. In the case of aseptic packages for long-storage products, such as UHT milk, the packaging material also comprises a layer of oxygen-barrier material, e.g. aluminium foil, which is superimposed on a layer of thermoplastic material, and is in turn covered with another layer of thermoplastic material forming the inner face of the package eventually contacting the food product.

More specifically, unit 1 interacts with a web 3 (FIGS. 3 to 5) of packaging material, fed in steps in a horizontal direction D and having a number of holes with a given spacing, to form a respective device 2 at each hole.

Device 2 is fitted about a removable portion of a relative package, i.e. a portion detachable from the rest of the package to pour out the pourable product.

With particular reference to FIG. 2, device 2 substantially comprises a spout 4 injection molded onto the package; and a known removable, e.g. screw, cap (not shown) fitted to and outwardly closing spout 4.

Spout 4 defines a through opening 6 communicating with a hole in the wall of the package.

Spout 4 substantially comprises a flat annular flange 7 fixed to the package, about the hole; and a cylindrical tubular neck portion 8 projecting axially from the inner radial edge of flange 7 and defining, with flange 7, opening 6 through which to pour out the food product. In the embodiment shown in the accompanying drawings, neck portion 8 is threaded externally to engage a respective screw cap.

Spout 4 is produced initially in a closed configuration, i.e. in which it comprises a membrane 9, which is made of plastic material, seals opening 6 outwardly, is connected integrally to spout 4, and is detachable from spout 4 along a preferential tear line.

On the side facing the cap in use, membrane 9 is fitted integrally with a projecting annular pull ring 11 by which to detach membrane 9 from spout 4 along the preferential tear line and so free opening 6 to pour out the product.

More specifically, ring 11 extends inside and a given distance from neck portion 8.

Unit 1 comprises a first mold 15 (not shown in FIG. 1) located on an upward-facing first side 23 of web 3; and two second molds 16 located on a downward-facing second side 24 of web 3 opposite side 23.

Mold 15 is substantially defined by a prismatic body having a flat wall 14, which faces side 23 of web 3, is coplanar with web 3, and is parallel to direction D.

Molds 16 are defined by respective bodies facing each other at respective end walls 17. More specifically, walls 17 are perpendicular to direction D, and each comprise a recess 18 with substantially C-shaped section.

Molds 15, 16 can be set to respective first configurations (FIGS. 3 and 4), in which they cooperate with sides 23, 24 of web 3 respectively. In the first configuration, walls 17 of molds 16 are positioned contacting each other, with recesses 18 facing each other to define a closed cavity 19 bounded laterally by recess 18 and at the top by wall 14 of mold 15.

More specifically, web 3 is fed in direction D so that, when molds 15, 16 are in the respective first configurations, web 3 is stationary with one of the holes in the web positioned over cavity 19.

Molds 15, 16 are movable from the respective first configurations to respective second configurations (shown partly in FIG. 5), in which they are detached from respective sides 23, 24 of web 3 to permit travel of web 3 in direction D.

More specifically, mold 15 is movable in known manner between the relative first and second configuration in a vertical direction to or from web 3. The movement of molds 16 between the relative first and second configuration is described in detail below.

Unit 1 advantageously comprises a first matrix 20 and a second matrix 21, which are movable into a configuration in which they are located inside cavity 19 to define a first volume 28 extending between first matrix 20 and one of molds 15, 16 and of the same shape as neck portion 8 and membrane 9, and a second volume 29 extending between matrixes 20 and 21 and of the same shape as ring 11. Matrixes 20, 21 are movable with respect to web 3 to disengage device 2 from volumes 28, 29 and to permit removal of device 2 by feeding web 3 forward. Unit 1 also comprises a single actuator 22, which moves mold 16 to/from web 3, and moves matrixes 20, 21 inside cavity 19 to/from web 3.

More specifically, in the configuration defining volumes 28 and 29, matrixes 20 and 21 are located a minimum distance from web 3; and matrix 21 coaxially surrounds an end portion of matrix 20 facing web 3, and is surrounded by molds 16.

Volumes 28 and 29 are symmetrical with respect to a vertical axis A perpendicular to direction D.

More specifically, volume 29 is defined radially by matrix 20 internally and by matrix 21 externally.

Volume 28 comprises a top portion 31 parallel to direction D and complementary in shape to membrane 9; and a lateral portion 32 extending axially and complementary in shape to neck portion 8.

More specifically, top portion 31 extends between mold 15 and the end of matrix 21 facing web 3, and lateral portion 32 extends between an outer contour of matrix 21 and respective inner contours of molds 16.

Volumes 28, 29 are connected, in known manner not shown, to a conduit for injecting heated thermoplastic material, which fills volumes 28, 29 to form device 2.

Actuator 22 is movable parallel to axis A to move matrixes 20, 21 to/from web 3.

The approach/withdrawal movement of the actuator comprises a first portion, along which matrix 20 is moved towards/withdrawn from web 3 inside cavity 19, while matrix 21 remains stationary with respect to web 3; and a second portion, along which matrix 21 is withdrawn from/moved towards web 3 integrally with matrix 20.

More specifically, the first portion of the withdrawal movement disengages ring 11 from volume 29, and the second portion of the withdrawal movement disengages neck portion 8 and membrane 9 from volume 28. By the end of the withdrawal movement, therefore, device 2 can be removed from cavity 19 by feeding web 3 forward in direction D.

Matrix 20 extends longitudinally along axis A, and comprises an axial end 25 facing web 3; and an end 26 opposite end 25 and connected operatively to actuator 22.

Actuator 22 slides matrix 20, parallel to axis A, between a first position (FIG. 1) in which end 25 cooperates with web 3, and a second position in which end 25 is detached from web 3.

Matrix 20 is connected operatively to actuator 22 by a tubular member 35 of axis A.

More specifically, opposite axial ends 36, 37 of member 35 are engaged respectively by a projection 38 defined by end 26 of matrix 20, and by a projection 39 at an axial end 40 of actuator 22.

End 36 of member 35 is housed inside a shoulder 44 on matrix 20, while end 37 cooperates with a surface 45 of actuator 22.

More specifically, shoulder 44 is annular, is interposed axially between projection 38 and a projection 45 of matrix 20, and is radially smaller than projections 38 and 45.

At ends 36, 37, member 35 is smaller radially than an intermediate portion 41 between ends 36, 37.

More specifically, projections 38, 39 come to rest against respective shoulders 42, 43 of member 35 located at ends 36, 37 respectively.

More specifically, when actuator 22 is withdrawn from web 3 along axis A, projection 39 comes to rest on shoulder 43 and, consequently, shoulder 42 comes to rest on projection 38 to withdraw matrix 20 from web 3 along axis A.

Similarly, when actuator 22 is moved towards web 3, surface 45 comes to rest against end 37, thus moving member 35 towards web 3, and, consequently, end 36 engages shoulder 44 to move matrix 20 along axis A towards web 3.

Matrix 21 is tubular, of axis A, and is interposed radially between molds 16 and matrix 20.

Actuator 22 moves matrix 21 along axis A by means of an actuating assembly 30 controlled by actuator 22. More specifically, actuator 22, by means of assembly 30, moves matrix 21 to or from web 3.

Assembly 30 moves matrix 21 in the course of the second portion of the movement of actuator 22.

Assembly 30 is symmetrical with respect to axis A, and comprises a ring 50 which cooperates with portion 41 at the end of the first portion of the withdrawal movement of first matrix 20 from web 3; a plate 51 connected to matrix 21; and a body 52 connected to ring 50 and plate 51.

Ring 50 has an end 55 fixed to a projection 57 of body 52; and an axial end 56 opposite end 55 and which cooperates with portion 41 to withdraw assembly 30 and matrix 21 from web 3.

Opposite axial ends of plate 51 are connected to matrix 21 in a manner not shown, and to body 52 by screws 53.

Each mold 16 is connected in known manner to a respective body 61 connected by a respective lever 62 to a portion 63 of unit 1.

More specifically, lever 62 is hinged at opposite ends to body 61 and to portion 63 about respective axes B, C perpendicular to direction D and axis A.

Bodies 61 and molds 16, with which they are integral, are connected operatively to actuator 22, via an actuating assembly 64, to move from the first to the second configuration by virtue of a force directed along axis A and by virtue of levers 62.

More specifically, when actuator 22 is withdrawn from web 3, assembly 64 acts on bodies 61 to rotate each lever 62 about respective axis B in such a direction as to withdraw respective axis C from axis A and web 3; each mold 16 therefore travels along an arc of a circle, with its centre at relative axis B, away from web 3 and axis A and into the second configuration, in which axes B and C of relative lever 62 lie in a respective plane sloping with respect to direction D and axis A.

When actuator 22 is moved towards web 3, assembly 64 acts on bodies 61 to rotate each lever 62 about respective axis B in such a direction as to move respective axis C towards axis A and web 3; each mold 16 therefore travels along an arc of a circle, with its centre at relative axis B, towards web 3 and axis A and back to the first configuration, in which axes B and C of relative lever 62 lie in a respective plane parallel to direction D and perpendicular to axis A.

More specifically, assembly 64 comprises a first and a second guide mechanism 65, 68 for connecting bodies 61 and plate 51.

Mechanism 65 comprises two horizontal guides 66 (FIG. 1) fitted integrally to plate 51 and each housed inside a respective seat 67 formed in relative body 61.

Mechanism 68 comprises two pins 69 housed in respective seats 73 in relative bodies 61. More specifically, each pin 69 has a first axial end 70 housed inside relative body 61; and a second axial end 71 opposite end 70 and connected to a respective plate 72 integral with plate 51.

Plate 51 comprises two slots 80 (only one shown in FIG. 1) located on opposite sides of matrix 21, and in which respective pins 69 slide as molds 16 move between the first and second configuration.

Plate 51 is connected to a fixed portion 81 of unit 1 by two helical springs 79 parallel to axis A, and which load plate 51 upwards to prevent matrix 21 and plate 51 from being drawn down by friction between the outer contour of matrix 20 and the inner contour of matrix 21 during the first portion of the movement of actuator 22.

Operation of unit 1 will now be described as of the first configurations of molds 15, 16. In the first configuration (FIG. 3), wall 14 of mold 15 cooperates with side 23 of web 3; and molds 16 cooperate with side 24 of web 3, and respective walls 17 are positioned contacting, so that recesses 18 define cavity 19.

Levers 62 are positioned so that respective axes B and C lie in a plane perpendicular to axis A and direction D.

One of the holes in web 3 is aligned with cavity 19.

End 25 of matrix 20 cooperates with side 24 of web 3; matrix 21 is set to the minimum-distance position from side 24 of web 3; matrixes 20, 21 define volume 29; and matrix 21 and molds 15, 16 define volume 28.

Actuator 22 and member 35 are so positioned along axis A that end 36 of member 35 rests against plate 51, and portion 41 is detached from ring 50.

Thermoplastic material is injected in known manner into volume 28 to form neck portion 8 and membrane 9, and into volume 29 to form ring 11.

Once injection of the material is completed and device 2 formed, actuator 22 is withdrawn from web 3 in a direction parallel to axis A, thus withdrawing matrixes 20, 21 from web 3.

Along the first portion (FIG. 4) of its withdrawal movement from web 3, actuator 22 withdraws member 35 and matrix 20 from web 3 to disengage ring 11.

Along said first portion of its withdrawal movement, however, actuator 22 does not move matrix 21, which remains in a fixed position with respect to web 3.

More specifically, the first portion of the withdrawal movement of the actuator terminates upon portion 41 coming to rest on ring 50.

More specifically, actuator 22 withdraws member 35 from web 3 by projection 39 coming to rest on shoulder 43, and withdraws matrix 20 from web 3 by shoulder 42 coming to rest on projection 38.

The second portion of the withdrawal movement of actuator 22 from web 3 withdraws matrix 20 further from web 3, and simultaneously withdraws matrix 21 from web 3 by means of assembly 30. More specifically, withdrawal of matrix 21 from web 3 disengages neck portion 8 and membrane 9 from volume 29.

Figure 5:
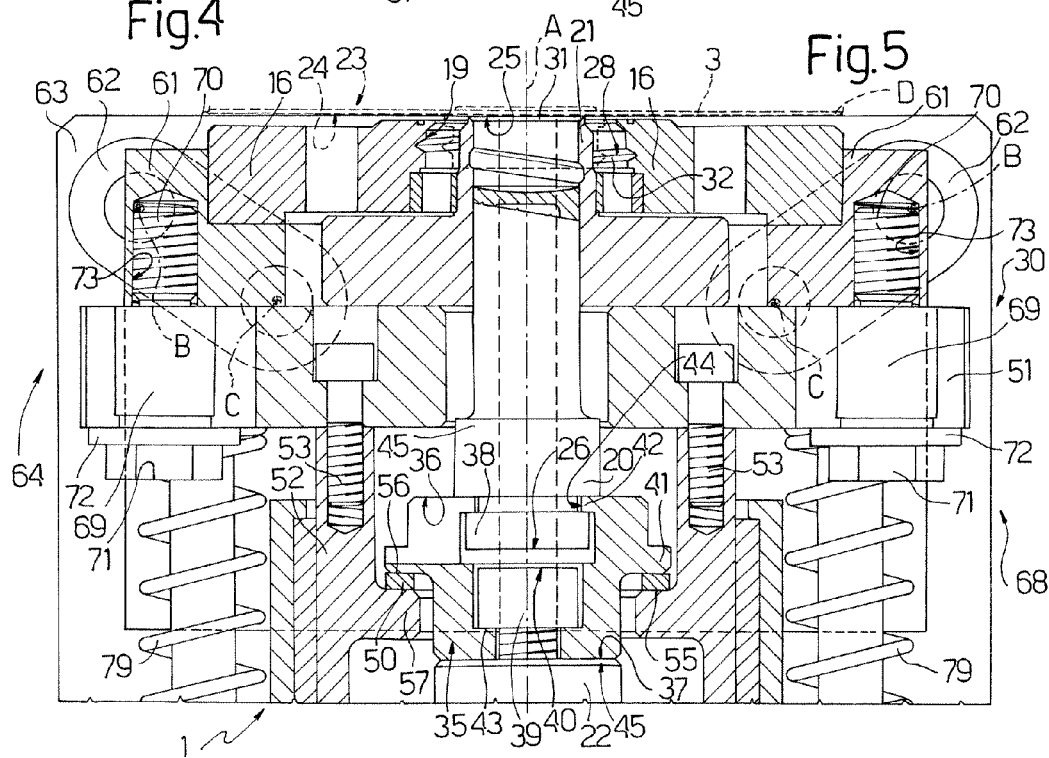

More specifically, withdrawal of ring 50 from web 3 withdraws body 52 from web 3 and consequently, by means of screws 53, also plate 51, which is integral with matrix 21 (FIG. 5).

Withdrawal of plate 51 from web 3 moves molds 16 from the first to the second configuration by means of levers 62.

More specifically, by means of mechanisms 65 and 68, withdrawal of plate 51 from web 3 also withdraws bodies 61 and molds 16 from web 3. Being connected to portion 63 by respective levers 62, bodies 61 and molds 16 rotate, as they withdraw, about respective hinge axes B so as to withdraw axes C from web 3 and axis A.

As they rotate, molds 16 withdraw from web 3 and axis A into the second configuration.

More specifically, mechanism 65 withdraws bodies 61 and molds 16 from web 3 by virtue of the connection between each guide 66 and respective seat 67.

Mechanism 68 lowers bodies 61 and molds 16 by virtue of the connection between each plate 72, integral with plate 51, and respective pin 69 secured to relative body 61.

As molds 16 and bodies 61 rotate about relative axes B, each pin 68 slides away from axis A inside respective slot 80.

At the same time molds 16 are withdrawn from web 3, molds 15 are withdrawn from side 23 of web 3 to move molds 15, 16 into the second configuration.

Once molds 15, 16 are in the respective second configurations, web 3 is fed forward to align a further hole in web 3 with axis A.

At this point, actuator 22 is moved towards web 3 along axis A to move molds 16 and matrixes 20, 21 towards web 3.

More specifically, the approach movement of actuator 22 comprises a first portion, along which matrix 20 is moved towards web 3 and matrix 21 remains stationary; and a second portion, along which both matrixes 20, 21 are moved towards web 3.

More specifically, along the first portion of its approach movement, actuator 22 moves member 35 from a start position, in which end 37 rests on end 56 of ring 50, to an end position, in which end 36 rests on plate 51.

Along said first portion of the approach movement of the actuator, surface 45 cooperates with end 37 to move member 35 towards web 3, and end 36 cooperates with shoulder 44 to move matrix 20 towards web 3.

Along the second portion of the approach movement of the actuator, end 36 pushes plate 51 towards web 3, thus moving matrix 21 towards web 3; and plate 51 in turn, by means of mechanisms 65 and 68, moves molds 16 towards web 3.

More specifically, by means of mechanisms 65 and 68, the movement of plate 51 towards web 3 also moves bodies 61 and molds 16 towards web 3. Being connected to portion 63 by respective levers 62, bodies 61 and molds 16 rotate, as they move towards web 3, about respective hinge axes B so as to move axes C towards web 3 and axis A and into a position in which axes B and C lie in the same plane perpendicular to axis A.

More specifically, mechanism 65 moves bodies 61 and molds 16 towards web 3 by virtue of the connection between each guide 66 and respective seat 67.

Mechanism 68 moves bodies 61 and molds 16 towards web 3 by virtue of the connection between each plate 72, integral with plate 51, and respective pin 69 secured to relative body 61.

As molds 16 and bodies 61 rotate about relative axes B, each pin 68 slides towards axis A inside respective slot 80.

During operation of actuator 22, springs 79 load plate 51 upwards to prevent matrix 20 from drawing along matrix 21 by friction along the first portion of the movement of actuator 22.

The advantages of unit 1 and the method according to the present invention will be clear from the foregoing description.

In particular, unit 1 provides for molding, by means of volumes 28 and 29, devices 2 having ring 11 projecting from membrane 9 inside and a given distance from neck portion 8.

By means of assembly 30 and member 35, unit 1 enables both matrixes 20, 21 and molds 16 to be operated using the same actuator 22.

This therefore enables precise, consistent synchronization of the operation of matrixes 20, 21 and molds 16, and a reduction in the size of unit 1.

Clearly, changes may be made to unit 1 and the method as described herein without, however, departing from the scope as defined in the accompanying Claims.

The invention claimed is:

1. A molding unit for producing opening devices for application to packages of pourable food products; said unit being fed with a web of packaging material having a number of holes; said opening device comprising a spout closed by a membrane detachable from the spout, a neck portion projecting from said spout and to which a cap is fitted releasably, and a pull ring extending from said membrane inside said neck portion and by which to detach the membrane from said spout; said unit comprising a first mold positionable on one side of said web and two second molds positionable on an opposite side of said web, the first and second molds cooperating, at one of said holes, with said web to define a closed cavity, the two second molds being connected to levers permitting the two second molds to move away from said web so as to be detached from said web and movable away from each other to open the cavity; said unit comprising a first and a second matrix adapted to be set to a configuration in which they are located inside the cavity to define a first volume extending between said first matrix and said first and second mold molds and of the same shape as said neck portion and said membrane, and a second volume of the same shape as said pull ring and extending between said first and said second matrix; said first and said second matrix being movable with respect to said web to disengage said opening device from said first and said second volume and permit removal of the opening device by feeding forward said web; said unit also comprising a single actuator, which moves at least said two second molds to/from said web and toward/away from each other, and moves said first and second matrix inside said cavity to/from said web.

2. A unit as claimed in claim 1, wherein said actuator performs an approach/withdrawal movement to move said first and second matrix to/from said web; said approach/withdrawal movement comprising a first portion along which one of said first and said second matrix is moved towards/withdrawn from said web while the other of said first and second matrix remains stationary with respect to the web, and a second portion along which said first and said second matrix are both moved towards/withdrawn from said web.

3. A unit as claimed in claim 2, wherein, along said first portion of said approach/withdrawal movement, said first matrix is moved towards/withdrawn from said web, and said second matrix is fixed with respect to said web.

4. A unit as claimed in claim 3, wherein said actuator is connected operatively to said first and said second matrix by a single body; said body being integral with said first matrix along the whole said movement of said actuator, and being integral with said second matrix along said second portion of said movement.

5. A unit as claimed in claim 4, wherein said body is connected to said first matrix, and comprises a first portion which cooperates, along the second portion of said withdrawal movement, with a first member integral with said second matrix; and a second portion which cooperates, along the second portion of said approach movement, with a second member integral with said second matrix.

6. A unit as claimed in claim 5, wherein said second molds are connected operatively to said first and said second member, and rotate, with respect to a fixed portion of said unit, away from said web when said first member cooperates with said first portion, and towards said web when said second member cooperates with said second portion.

7. A unit as claimed in claim 6, comprising connecting means for operatively connecting said second member and said second molds; said connecting means comprising at least one additional member fitted to said second member, and a seat engaged by said additional member and integral with said second molds.

8. A unit as claimed in claim 7, comprising at least one slot in which said additional member slides as the second molds move to and from said web.

9. A unit as claimed in claim 5, comprising elastic means acting on said second member and for keeping said second matrix in a given position with respect to said first matrix along said first portion of said approach/withdrawal movement.

10. A molding unit for producing opening devices for application to packages of pourable food product; the unit being supplied, during operation, with a web of packaging material having a plurality of holes; the opening device comprising a spout closed by a membrane detachable from the spout, a neck portion projecting from the spout and to which a cap is releasably fitted, and a pull ring extending from the membrane inside the neck portion and by which to detach the membrane from the spout; the unit comprising:

first and second molds adapted to be set, during operation, to respective first configurations in which they cooperate at one of the holes with the web to define a closed cavity; the first and second molds being movable, during operation from the respective first configurations to respective second configurations in which they are detached from the web;

a first matrix and a second matrix adapted to be positioned inside the cavity to define a first volume and a second volume, the first volume extending between the first matrix and the first and second molds and possessing the same shape as the neck portion and the membrane of the opening device, and the second volume possessing the same shape as the pull ring of the opening device and extending between the first matrix and the second matrix;

the first matrix and the second matrix being movable with respect to the web to disengage the opening device from the first volume and the second volume to permit removal of the opening device by feeding forward the web;

a single actuator movable along an approach/withdrawal movement to move the first matrix and second matrix inside the cavity towards/away from the web, the approach/withdrawal movement comprising a first and a second portion;

at least one of the first and second molds being movable by the actuator towards/from the web;

a single body connected to the first matrix and to the actuator to move the first matrix towards/away from the web along the first portion and the second portion of the approach/withdrawal movement;

the body comprising a first portion cooperating, during operation, along the second portion of the withdrawal movement, with a first member integral with the second matrix to move the second matrix away from the web;

the body further comprising a second portion cooperating, during operation, along the second portion of the approach movement, with a second member integral with the second matrix to move the second matrix towards the web;

the first member and the second member being arranged so that they are detached respectively from the first portion and second portion of the body along the first portion of the withdrawal/approach movement, so that the second matrix remains stationary with respect to the web along the first portion of the withdrawal/approach movement.

11. A unit as claimed in claim 10, wherein the second mold comprises two second mold portions.

12. A unit as claimed in claim 11, wherein the second mold portions are operatively connected to the first and the second member and are rotatable, with respect to a fixed portion of the unit, away from/towards the web.

13. A unit as claimed in claim 10, further comprising connecting means for operatively connecting the second member and the second mold, the connecting means comprising at least one member fitted to the second member, and a seat engaged by the member and integral with the second mold.

14. A unit as claimed in claim 10, further comprising at least one slot in which the member is slidable.

15. A unit as claimed in claim 10, further comprising elastic means acting on the second member for keeping the second matrix in a given position with respect to the first matrix along the first portion of the approach/withdrawal movement.

16. A molding unit for producing opening devices for application to packages of pourable food products; said unit being fed with a web of packaging material having a number of holes; said opening device comprising a spout closed by a membrane detachable from the spout, a neck portion projecting from said spout and to which a cap is fitted releasably, and a pull ring extending from said membrane inside said neck portion and by which to detach the membrane from said spout; said unit comprising a first mold positionable on one side of said web and two second molds positionable on an opposite side of said web, the first and second molds cooperating, at one of said holes, with said web to define a closed cavity, each of the second molds being connected to a respective lever rotatably mounted about a rotation axis permitting the second molds to rotate about the respective rotation axes to move away and be detached from said web while also moving away from each other to open the cavity; the rotation axes being spaced apart from one another; said unit comprising a first and a second matrix adapted to be set to a configuration in which they are located inside the cavity to define a first volume extending between said first matrix and said first and second molds and of the same shape as said neck portion and said membrane, and a second volume of the same shape as said pull ring and extending between said first and said second matrix; said first and said second matrix being movable with respect to said web to disengage said opening device from said first and said second volume and permit removal of the opening device by feeding forward said web; said unit also comprising a single actuator, which rotates said two second molds about the respective rotation axes so the two second molds move to/from said web and toward/away from each other, and moves said first and second matrix inside said cavity to/from said web.

17. A molding unit for producing opening devices for application to packages of pourable food product; the unit being supplied, during operation, with a web of packaging material having a plurality of holes; the opening device comprising a spout closed by a membrane detachable from the spout, a neck portion projecting from the spout and to which a cap is releasably fitted, and a pull ring extending from the membrane inside the neck portion and by which to detach the membrane from the spout; the unit comprising:

first and second molds adapted to be set, during operation, to respective first configurations in which they cooperate at one of the holes with the web to define a closed cavity; the first and second molds being movable, during operation from the respective first configurations to respective second configurations in which they are detached from the web;

a first matrix and a second matrix adapted to be positioned inside the cavity to define a first volume and a second volume, the first volume extending between the first matrix and the first and second molds and possessing the same shape as the neck portion and the membrane of the opening device, and the second volume possessing the same shape as the pull ring of the opening device and extending between the first matrix and the second matrix;

the first matrix and the second matrix being movable with respect to the web to disengage the opening device from the first volume and the second volume to permit removal of the opening device by feeding forward the web;

a single actuator movable along an approach movement toward the web to move the first matrix and the second matrix inside the cavity towards the web and a withdrawal movement away from the web to move the first matrix and second matrix inside the cavity away from the web, the approach movement of the single actuator comprising a first portion and a second portion, the withdrawal movement of the single actuator comprising a first portion and a second portion;

at least one of the first and second molds being movable by the actuator towards/from the web;

a single body connected to the first matrix and to the actuator to move the first matrix towards the web during both the first portion and the second portion of the approach movement of the actuator and to move the first matrix away from the web during both the first portion and the second portion of the withdrawal movement of the actuator;

the body comprising a first portion directly contacting a first member integral with the second matrix during the second portion of the withdrawal movement of the actuator to move the second matrix away from the web during the second portion of the withdrawal movement of the actuator;

the first portion of the body being spaced from the first member during the first portion of the withdrawal movement of the actuator so the second matrix remains stationary and is not moved away from the web during the first portion of the withdrawal movement of the actuator;

the body further comprising a second portion directly contacting a second member integral with the second matrix during the second portion of the approach movement of the actuator to move the second matrix towards the web;

the second portion of the body being spaced from the second member during the first portion of the approach movement of the actuator so the second matrix remains stationary and is not moved toward the web during the first portion of the approach movement of the actuator;

the first portion of the body which directly contacts the first member of the second matrix during the second portion of the withdrawal movement of the actuator being spaced from the second portion of the body which directly contacts the second member of the second matrix during the second portion of the approach movement of the actuator; and the first and second members of the second matrix being spaced apart from one another.

18. A unit as claimed in claim 17, wherein a portion of the body axially overlaps a portion of the actuator, and a different portion of the body axially overlaps the first matrix.

19. A unit as claimed in claim 17, wherein the body possesses opposite axial ends and includes a hollow region at each axial end, an end portion of the actuator being positioned in the hollow region at one axial end of the body, and an end portion of the first matrix being positioned in the hollow region at the other axial end of the body.

20. A unit as claimed in claim 17, wherein the second mold is one of two second molds, each of the second molds being connected to a respective lever rotatably mounted to rotate about a rotation axis to guide each of the second molds to rotate about the respective rotation axis and rotate away from one another and toward one another.

\* \* \* \* \*